US009215160B2

(12) United States Patent
Ishikawa

(10) Patent No.: US 9,215,160 B2
(45) Date of Patent: Dec. 15, 2015

(54) ADJUSTMENT TEST APPARATUS FOR AI MODULE

(75) Inventor: Tomohide Ishikawa, Chiyoda-ku (JP)

(73) Assignee: MITSUBISHI ELECTRIC CORPORATION, Chiyoda-Ku Tokyo (JP)

( * ) Notice: Subject to any disclaimer, the term of this patent is extended or adjusted under 35 U.S.C. 154(b) by 669 days.

(21) Appl. No.: 13/605,349

(22) Filed: Sep. 6, 2012

(65) Prior Publication Data

US 2013/0317774 A1 Nov. 28, 2013

(30) Foreign Application Priority Data

May 24, 2012 (JP) ................................ 2012-118203

(51) Int. Cl.
*H04L 12/26* (2006.01)
*H04L 12/413* (2006.01)
*H04L 12/64* (2006.01)
*H04L 29/12* (2006.01)

(52) U.S. Cl.
CPC .............. *H04L 43/50* (2013.01); *H04L 12/413* (2013.01); *H04L 12/6418* (2013.01); *H04L 61/2038* (2013.01)

(58) Field of Classification Search
CPC ....................................................... H04L 43/50
USPC ........................................................ 702/109
See application file for complete search history.

(56) References Cited

U.S. PATENT DOCUMENTS 4,158,884 A * 6/1979 McKinley et al. ............ 701/100
2005/0156583 A1 * 7/2005 Nachamiev et al. .......... 323/283

FOREIGN PATENT DOCUMENTS

JP 2010-020603 A 1/2010

* cited by examiner

*Primary Examiner* — Bryan Bui
(74) *Attorney, Agent, or Firm* — Buchanan Ingersoll & Rooney PC

(57) ABSTRACT

An adjustment test apparatus for AI module is disclosed, which includes a signal generator supplying analog electric quantity to a plurality of the same type of AI modules, and a maintenance PC connected to each AI module, the maintenance PC being connected to each AI module through a USB hub having a port corresponding to each AI module and a USB-RS232 converter connected to each port, the maintenance PC having a function of selecting a port to communicate with each AI module, and a function of monitoring a digital output value corresponding to an input signal provided by the signal generator to each AI module at the time of communication and setting each AI module to correct the output value to a proper value.

7 Claims, 8 Drawing Sheets

ADJUSTMENT TEST APPARATUS FOR AI MODULE

BACKGROUND OF THE INVENTION

1. Field of the Invention

The present invention relates to an adjustment test apparatus that tests and adjusts the same type of analog input modules (referred to as AI modules) used in an instrumentation controller before the AI modules are incorporated into a product.

2. Background of the Invention

FIGS. 7 and 8 are block diagrams showing an adjustment test apparatus for AI module in the past. In the adjustment test apparatus in the past shown in FIG. 7, AI modules 101 to be adjusted are disposed in a test controller 102, a maintenance PC 103 and the test controller 102 are connected to each other by a general-purpose communication line such as Ethernet (registered trademark), and, depending on test conditions, each signal to be entered into each AI module is changed by a signal generator 104, then an adjustment test is performed by the maintenance PC 103. See JP-A-2010-20603, page 12, FIG. 1.

Further, in the adjustment test apparatus in the past shown in FIG. 8, an operator connects an AI module 101 and the maintenance PC 103 in a one-to-one correspondence by a general-purpose communication line, and performs an adjustment test in the same way as above.

The adjustment test apparatus in the past shown in FIG. 7, which is a system in which a plurality of AI modules 101 each having different specifications are incorporated into the instrumentation controller before an adjustment test is performed, includes the test controller 102, the maintenance PC 103 and the signal generator 104; therefore, the size of the apparatus is large, and preparation time for the adjustment test is required. Further, in the adjustment test apparatus in the past shown in FIG. 8, the operator has to manually change the connection between the maintenance PC 103 and the signal generator 104 for each of the AI modules 101 to be adjusted, which is time consuming.

The present invention is made to solve the above-mentioned problems, and it is desirable to simplify an adjustment test apparatus for AI module, and shorten the time for the adjustment test.

SUMMARY OF THE INVENTION

An adjustment test apparatus for AI module according to the present invention includes a signal generator supplying analog electric quantity to a plurality of the same type of AI modules, and a maintenance PC connected to each AI module. The maintenance PC is connected to each AI module through a USB hub having a port corresponding to each AI module and a USB-RS232 converter connected to each port. The maintenance PC has a function of selecting a port to communicate with each AI module, and a function of monitoring a digital output value corresponding to an input signal provided by the signal generator to each AI module at the time of communication and setting each AI module to correct the output value to a proper value.

In addition, an adjustment test apparatus for AI module according to the present invention includes a signal generator supplying analog electric quantity to a plurality of the same type of AI modules, and a maintenance PC connected to each AI module by a bus. An address is assigned to each AI module. The maintenance PC has a function of communicating with each AI module based on the address, and a function of monitoring a digital output value corresponding to an input signal provided by the signal generator to each AI module at the time of communication and setting each AI module to correct the output value to a proper value.

According to the present invention, since a general-purpose apparatus that allows a plurality of AI modules to be connected is constituted, a test controller in which a CPU or a communication card is incorporated is unnecessary, allowing the entire test apparatus to be reduced, and the preparation time for the adjustment test to be shortened. Further, there is no need to change the connections at each adjustment test of each AI module, allowing the operating time to be shortened.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
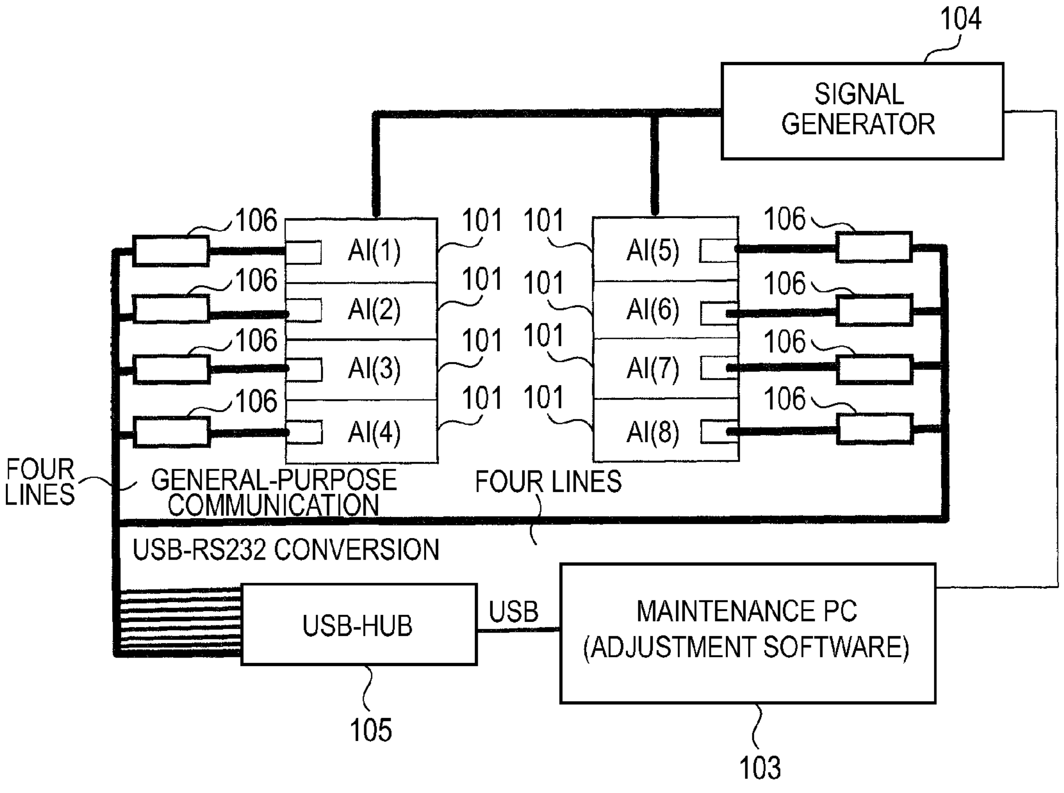
FIG. 1 is a block diagram showing an adjustment test apparatus for AI module according to Embodiment 1 of the present invention.

Embodiment 1 of the present invention will now be described with reference to FIGS. 1 and 2. The present invention relates to an adjustment test apparatus that tests and adjusts a plurality of AI modules having the same specifications (referred to as the same type) all at once. In FIG. 1, a plurality of, eight in the figure of the same type of AI modules 101 (AI (1) to AI (8)) to be subjected to adjustment tests, are set in the test apparatus in a production line, for example. Input signals that are test input of voltage, current and the like are applied in parallel to the input side of each of set AI modules 101 from the signal generator 104. A general-purpose USE/RS232 converter 106 is connected to the output side of each of the AI modules 101, and connected via a USB hub 105 to the maintenance PC 103 in which adjustment software is installed. The USB hub 105 has eight ports, and each port is connected to each of the AI modules 101 through the general-purpose USB/RS232 converter 106 in a one-to-one correspondence. The USB hub 105 is connected to the maintenance PC 103 via a USE cable.

The maintenance PC 103 uses the adjustment software to perform the adjustment test of the AI modules 101 while communicating with the AI modules 101. The maintenance PC 103 has functions shown in FIG. 2; that is, a function U of setting signal generator output, a function V of detecting the number of AI modules and setting communication ports, a function W of performing AI module output comparison, and a function X of adjusting AI module output. The maintenance PC 103 does not necessarily have the function U of setting signal generator output among of these functions. The function U may be performed by hand power.

When an adjustment test is started, the maintenance PC 103 sets (selects) the number of AI modules 101 to be adjusted and the communication ports to be connected. Then, the output from the signal generator 104 is set by the maintenance PC 103, and, from the signal generator 104, a given, for example, analog voltage test input signal is applied to each of the AI modules 101 (1) to (8). The test input signal values may be set manually or by the maintenance PC 103. When selecting the port of the AI module 101 (1), for example, the maintenance PC 103 communicates with the AI module 101 (1) via the USB hub 105 and the USB/RS232 converter 106.

At the time of communication, the maintenance PC 103 takes (monitors) the output digital signal from the AI module 101 (1) and performs output comparison, which is intended to, analyze the output digital signal to determine whether the output digital signal represents a predetermined value. Next, the maintenance PC 103 returns an adjustment signal for adjusting the deviation from the predetermined value to the AI module 101 (1) in order to adjust the output from the AI module 101 (1), and sets the value. When the adjustment of the AI module 101 (1) is completed, the maintenance PC 103 selects the next communication port and communicates with the AI module 101 (2) to perform the similar adjustment. In this manner, the maintenance PC 103 adjusts all the AI modules 101 and completes the adjustment test. The setting of the test input signal values, the selection of the communication port, the monitoring of the output digital signals from the AI modules 101 and the adjustment of the AI modules 101 are all performed by the software installed in the maintenance PC 103. Therefore, connection changing and switching operations by a switch at the time of the adjustment test are eliminated, and the adjustment test of a plurality of AI modules can be performed all at once on the manufacturing line.

Figure 3:
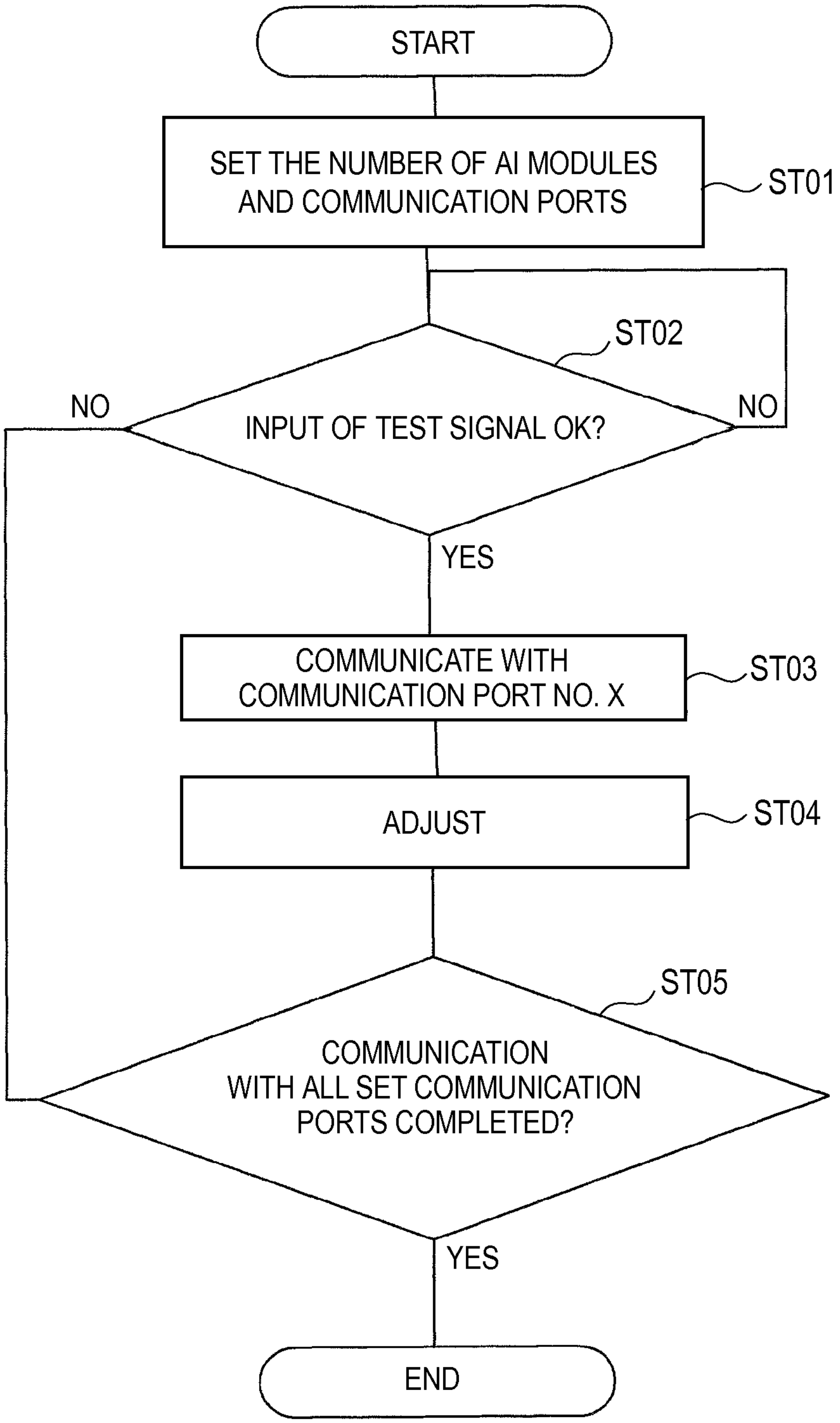
FIG. 3 is a flow chart showing the operation of adjustment software according to Embodiment 1.

FIG. 3 shows an operational flow chart of the adjustment software. The description will be provided with reference to FIG. 3. In step ST01, the number of the AI modules 101 to be adjusted and the communication ports to be connected are set by the adjustment software in the maintenance PC 103. Instep ST02, the set signal is output from the signal generator 104 to each of the AI modules 101 according to test conditions. In step ST03, communication with the AI modules 101 is established via the communication ports set in step ST01, and, from the received data, output value comparison is performed. In step ST04, the deviation of the output from each AI module from the predetermined value is adjusted. Finally, in step ST05, whether communication has completed with all the communication ports set in step ST01 is checked, and the processing is ended. Therefore, a plurality of AI modules can be adjusted without preparing a test controller, and without connection changes with respect to test conditions, allowing the operating time to be shortened.

Embodiment 2

Figure 4:
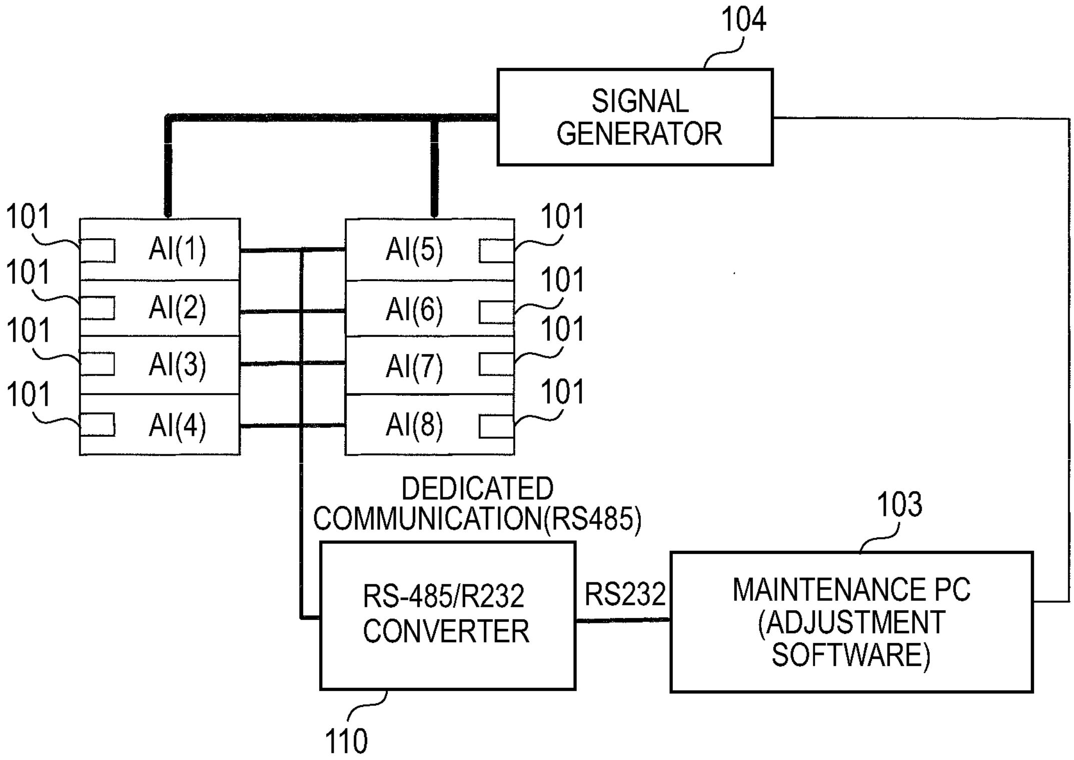
FIG. 4 is a block diagram showing an adjustment test apparatus for AI module according to Embodiment 2 of the present invention.

FIG. 4 shows an adjustment test apparatus according to Embodiment 2 of the present invention, in which the input sides of eight same type of AI modules 101 (AI (1) to AI (8)) are connected to the signal generator 104 in parallel. The output side of each AI module is connected to the bus of a general-purpose RS485/RS232 converter 110, and the RS485/RS232 converter 110 is connected to the maintenance PC 103 by an RS232 cable. An address is assigned to each of the AI modules 101.

The maintenance PC 103 uses the adjustment software to perform the adjustment test of the AI modules 101 while communicating with the AI modules 101. The maintenance PC 103 has functions shown in FIG. 5; that is, a function U of setting signal generator output, a function Z of detecting the number of AI modules and assigning addresses, a function W of. performing AI module output comparison, and a function X of adjusting AI module output. The maintenance PC 103 does not necessarily have the function U of setting signal generator output among of these functions. The function U may be performed by hand power.

When an adjustment test is started, the maintenance PC 103 sets (selects) the number of AI modules 101 to be adjusted and the addresses of the AI modules 101 to be connected. Then, the output from the signal generator 104 is set by the maintenance PC 103, and, from the signal generator 104, a given, for example, analog voltage test input signal is applied to each of the AI modules 101 (1) to (8). The test input signal values may be set manually or by the maintenance PC 103. The maintenance PC 103 performs packet communication with the AI module 101 (1) based on the address of AI (1) of the AI modules 101, for example.

At the time of communication, the maintenance PC 103 takes (monitors) the output digital signal from the AI module 101 (1) and performs output comparison, which is the function for analyzing the output digital signal to determine whether the output digital signal represents a predetermined value. Next, the maintenance PC 103 returns an adjustment signal for adjusting the deviation from the predetermined value to the AI module 101 (1) in order to adjust the output, and sets the value for the AI module 101 (1). When the adjustment of the AI module 101 (1) is completed, the maintenance PC 103 selects the next address and performs packet communication with the AI module 101 (2) to perform the similar adjustment. In this manner, the maintenance PC 103 adjusts all the AI modules 101 and completes the adjustment test. The setting of the test input signal values, the setting of the communication address, the monitoring of the output digital signals from the AI modules 101 and the adjustment of the AI modules 101 are all performed by the software installed in the maintenance PC 103. Therefore, connection changing and switching operations by a switch at the time of the adjustment test are eliminated, and the adjustment test of a plurality of AI modules can be performed all at once on the manufacturing line.

Figure 6:
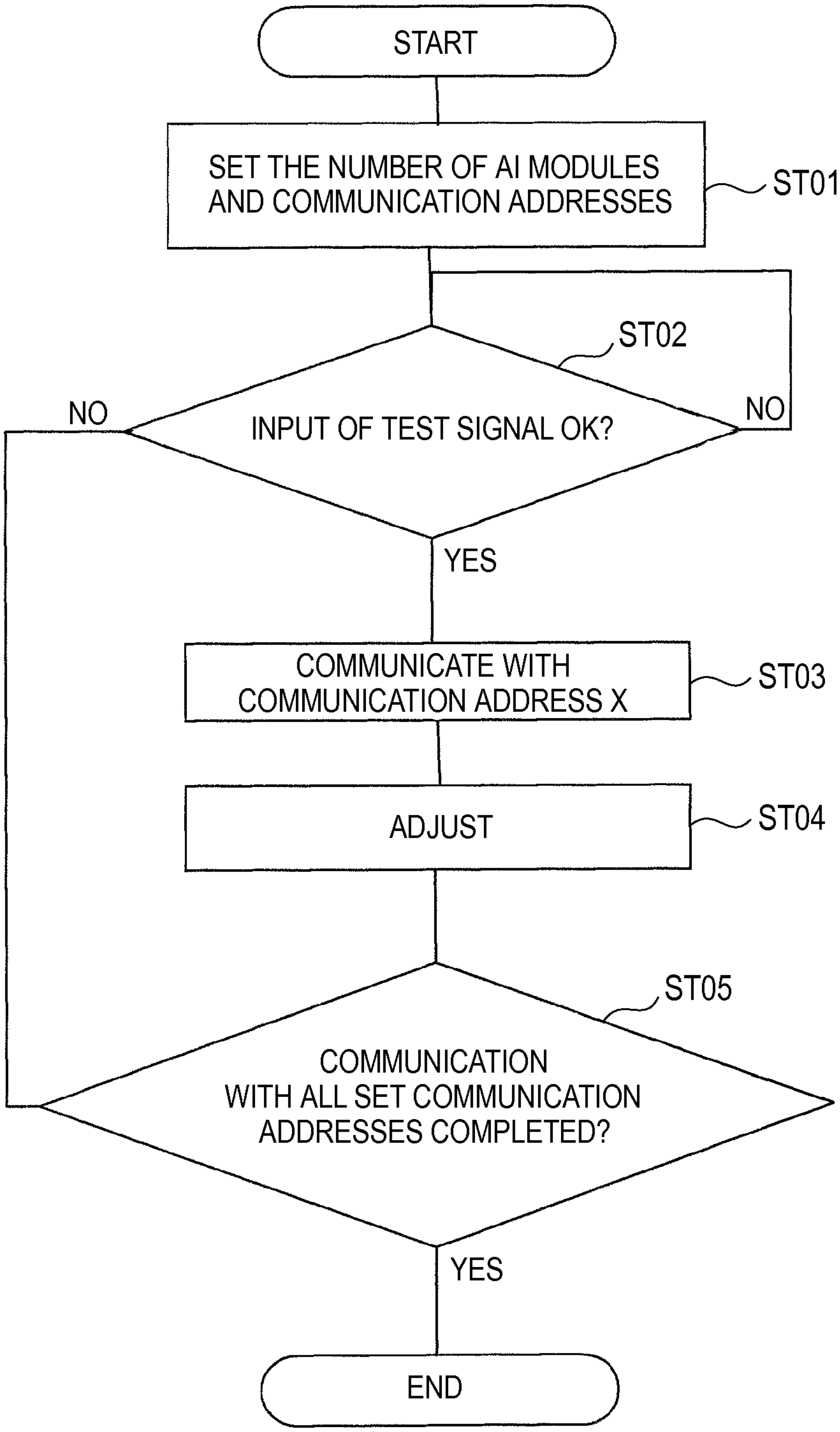
FIG. 6 is a flow chart showing the operation of adjustment software according to Embodiment 2.
Figure 7:
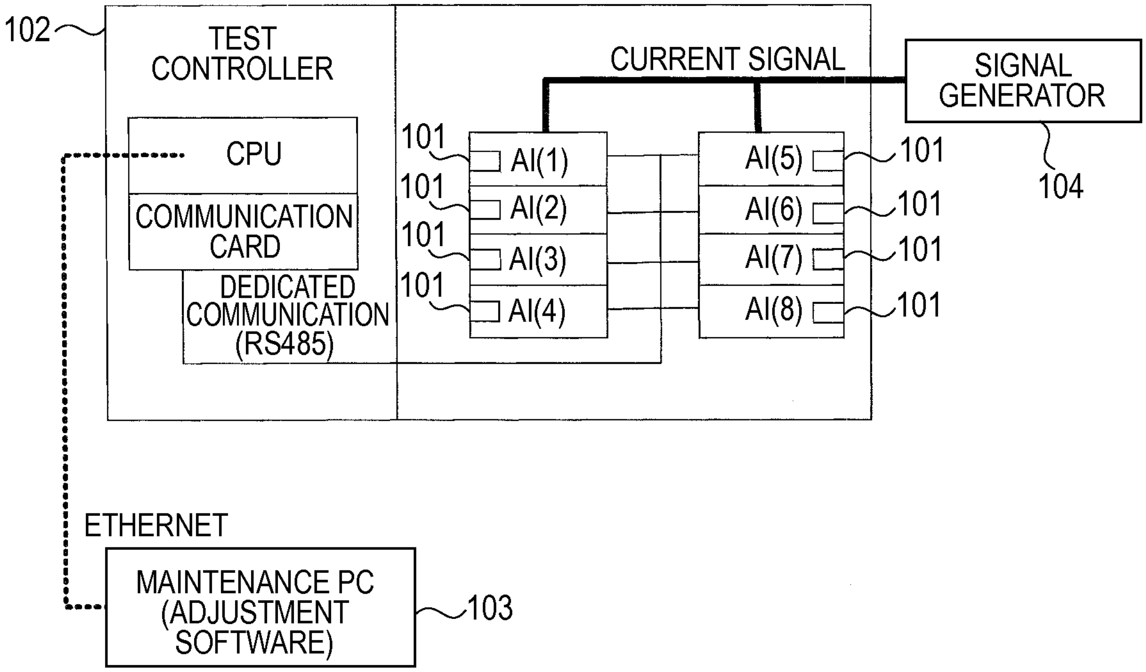
FIG. 7 is a block diagram showing an adjustment test apparatus for AI module in the past.
Figure 8:
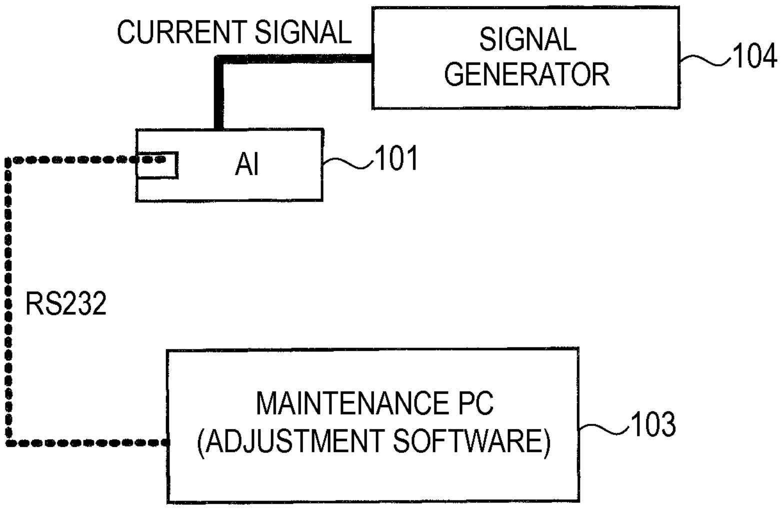
FIG. 8 is a block diagram showing another adjustment test apparatus for AI module in the past.

FIG. 6 is a flow chart showing the operation of the adjustment software installed in the maintenance PC 103. First, in step ST01, the number of the AI modules 101 to be adjusted and the communication address of each AI module are set. In step ST02, the set signal is output from the signal generator 104 according to test conditions. In step ST03, packet communication with the AI module 101 is established via the communication address set in step ST01, and, from the received data, output value comparison is performed. Unlike Embodiment 1, the communication contents can be realized by having a communication packet constitution adapted to a dedicated communication. In step ST04, the output adjustment of the AI modules 101 is performed by the maintenance PC 103. In step ST05, whether communication has completed with all the communication addresses set in step ST01 is checked, and the processing is ended. Therefore, as in Embodiment 1, Embodiment 2 can also shorten operating time and simplify the apparatus.

Embodiment 3

Figure 2:
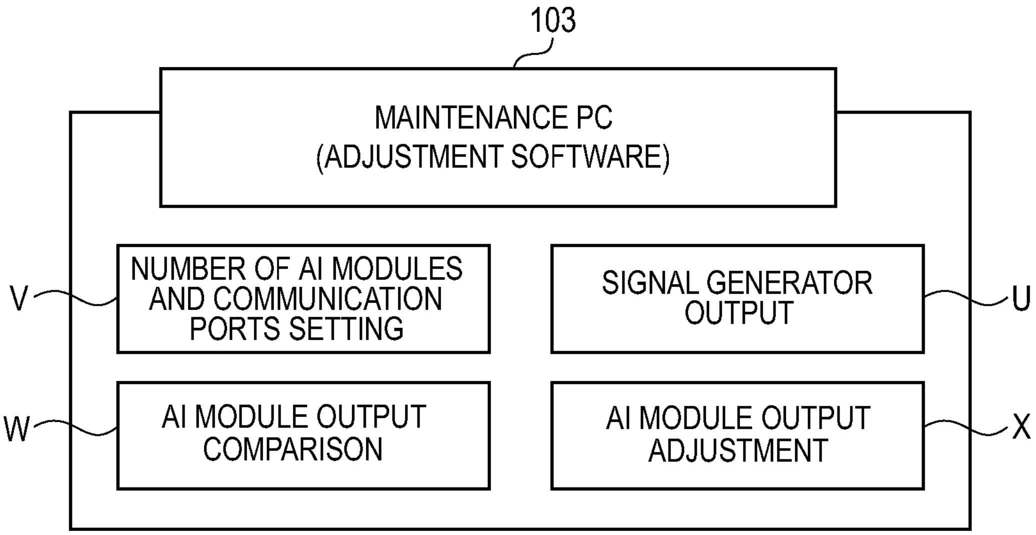
FIG. 2 is a diagram showing functions of a maintenance PC of Embodiment 1.
Figure 5:
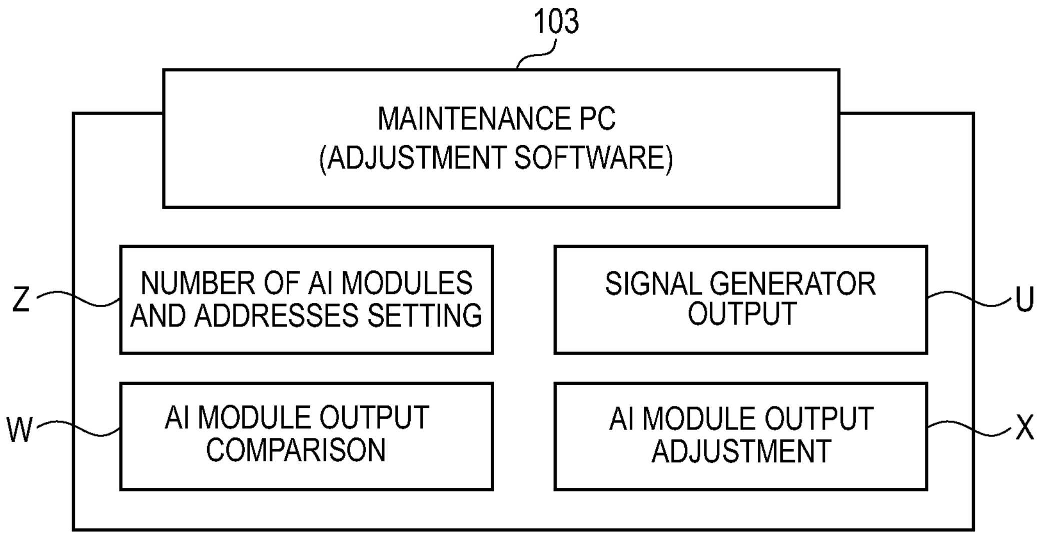
FIG. 5 is a diagram showing functions of a maintenance PC of Embodiment 2.

In Embodiment 1 and Embodiment 2, while the functions of the maintenance PC 103 are as shown in FIGS. 2 and 5, it goes without saying that, by adding to the adjustment software installed in the maintenance PC 103 a further function for saving information from a card such as the type of the AI module, the adjustment results, the test time and date or the like, an adjustment record (adjustment result evidence) of the AI module can be prepared, and the operating time can be shortened. Note that, the present invention is not limited to the above-mentioned embodiments and the embodiments may be modified without departing from the scope of the present invention as appropriate. Various modifications and alterations of this invention will be apparatus to those skilled in the art without departing from the scope and spirit of this invention, and it should be understood that this is not limited to the illustrative embodiments set forth herein.

What is claimed is:

1. An adjustment test apparatus for AI modules comprising:

a signal generator supplying an analog electric quantity to a plurality of the same type of AI modules; and a maintenance PC connected to each of the AI modules, wherein the maintenance PC is connected to each of the AI modules through a USB hub having a plurality of ports respectively corresponding to each of the AI modules, each port of the USB hub is connected to a corresponding USB-RS232 converter, and each of the corresponding USB-RS232converters is connected to a corresponding AI module, and the maintenance PC has a function of selecting the respective port to communicate with each of the AI modules, and a function of monitoring a digital output value of each of the AI modules corresponding to an input signal provided by the signal generator to each of the AI modules at the time of communication and setting each of the AI modules to correct the output value to a predetermined value based on a deviation between the output value and the predetermined value.

2. The adjustment test apparatus for the AI modules according to claim 1, wherein the maintenance PC has a function of setting an output electric quantity from the signal generator.

3. The adjustment test apparatus for the AI modules according to claim 1, wherein the maintenance PC has a function of saving information including the type of the AI module, an adjustment result, a test time, and a date.

4. The adjustment test apparatus for the AI modules according to claim 1, wherein the maintenance PC selects the number of AI modules to be adjusted and the ports to be connected.

5. An adjustment test apparatus for AI modules comprising:

a signal generator supplying an analog electric quantity to a plurality of the same type of AI modules, and a maintenance PC connected to each of the AI modules on an output side by a RS485 bus, and a RS485/RS232 converter is connected to the RS485 bus and the maintenance PC, wherein an address is assigned to each of the AI modules, the maintenance PC has a function of communicating with each of the AI modules based on the address, and a function of monitoring a digital output value of each of the AI modules outputted on the RS485 bus corresponding to an input signal provided by the signal generator to each of the AI modules at the time of communication and setting each of the AI modules to correct the output value to a predetermined value based on a deviation between the output value and the predetermined value.

6. The adjustment test apparatus for the AI modules according to claim 5, wherein the maintenance PC has a function of setting an output electric quantity from the signal generator.

7. The adjustment test apparatus for AI modules according to claim 5, wherein the maintenance PC has a function of saving information including the type of the AI module, an adjustment result, a test time, and a date.

* * * * *